H. E. Stager,
Bending Wood,
No. 51,978. Patented Jan. 9, 1866.

Sheet 1 - 2 Sheets.

Witnesses:

Inventor:
Henry E. Stager

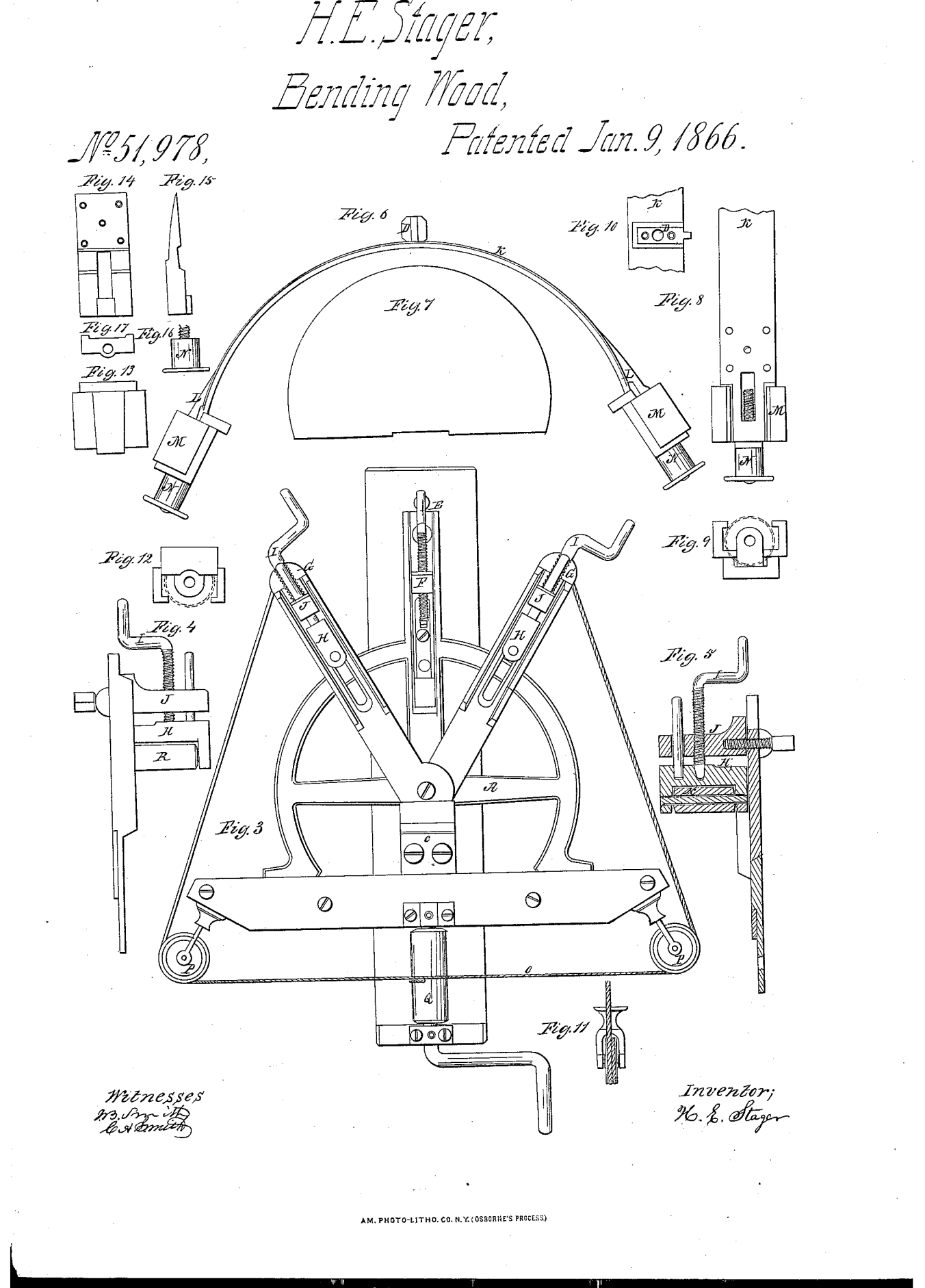

H. E. Stager,
Bending Wood,
N° 51,978. Patented Jan. 9, 1866.

UNITED STATES PATENT OFFICE.

H. E. STAGER, OF MILWAUKEE, WISCONSIN.

IMPROVEMENT IN WOOD-BENDING MACHINES.

Specification forming part of Letters Patent No. 51,978, dated January 9, 1866.

*To all whom it may concern:*

Be it known that I, H. E. STAGER, of the city and county of Milwaukee, and State of Wisconsin, have invented a new and useful Improvement in Wood-Bending Machines; and I do hereby declare that the following is a full, clear, and exact description of the same, reference being had to the accompanying drawings, forming a part of this specification, in which—

Figure 1:
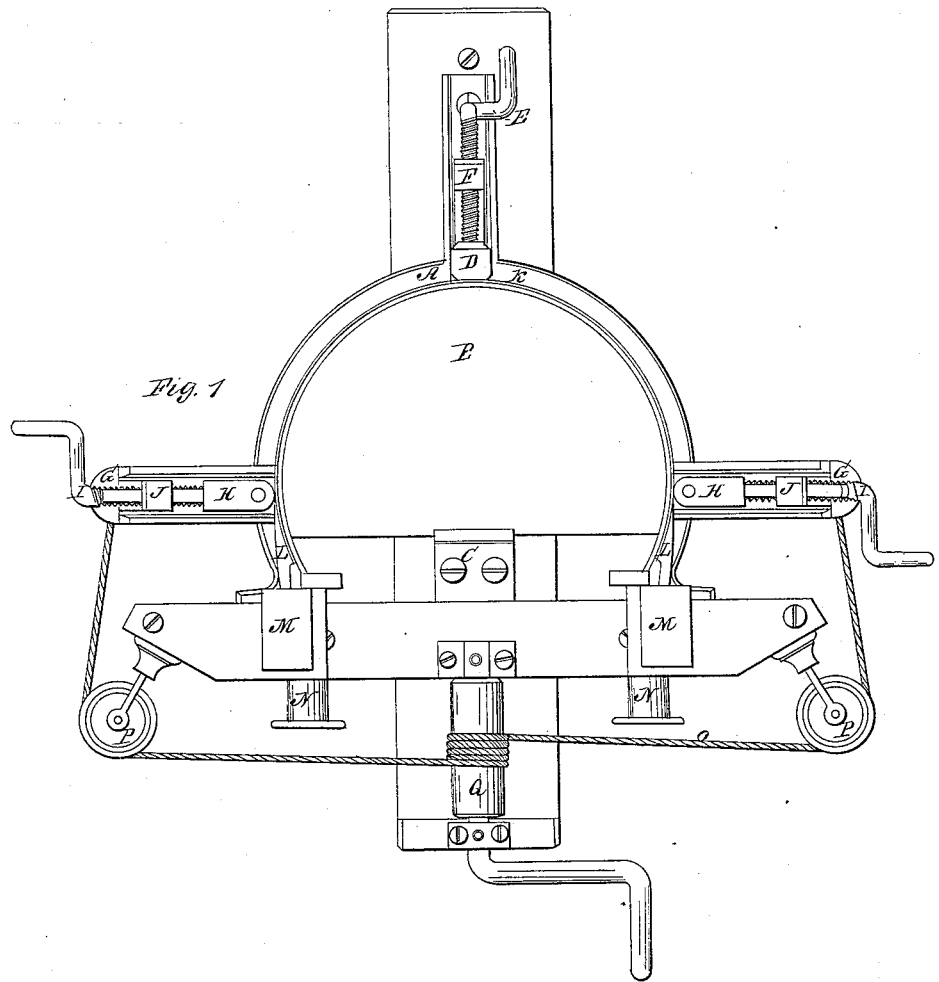
Figure 2:
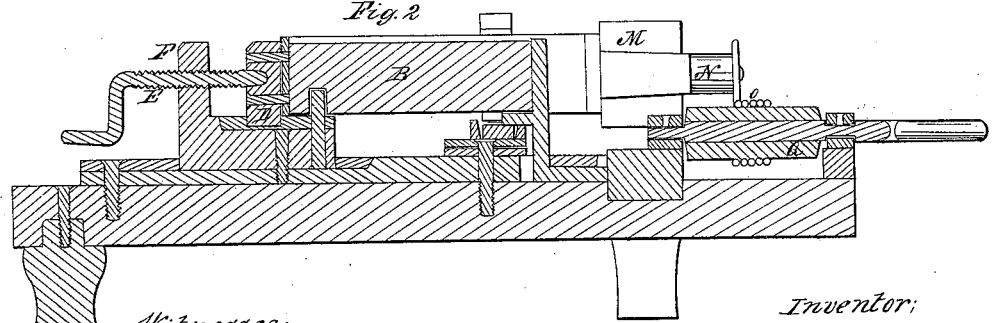

Figure 1 is a plan view of the machine, showing a piece of wood bent, the bending-levers nearly drawn home; Fig. 2, a transverse sectional view; Fig. 3, a skeleton view, showing the bed-plate and operating parts of the machine; Fig. 4, one of the bending-levers; Fig. 5, a transverse sectional view of one of the bending-levers; Fig. 6, bending-band with adjustable end-pressure blocks; Fig. 7, form or mold to bend over or around; Fig. 8, a transverse sectional view of adjustable end-pressure block with adjusting-screw and spring-washers; Fig. 9, outer end of adjustable end-pressure block; Fig. 10, center-pressure block; Fig. 11, one of the sheaves around which the rope with which the bending-levers are operated passes; Fig. 12, inner end of one of the adjustable end-pressure blocks; Fig. 13, end-pressure block; Fig. 14, end piece on bending-band, to which end-pressure block is attached; Fig. 15, top of Fig. 14; Fig. 16, screw with spring-washers to adjust end-pressure block; Fig. 17, end of Fig. 14.

Similar letters of reference in each of the figures indicate corresponding parts.

The nature of my invention consists in a novel arrangement of mechanism to bend wood in circular or eccentric form without breaking the same.

To enable others skilled in the art to make and use my invention, I will proceed to describe its construction and operation.

I make my bending-machine principally of metal.

A is an iron bed-plate on a wooden frame, on which the form or mold and bending-works are placed; B, the form or mold around which to bend wood; C, stop against which the form rests when wood is being bent; D, adjustable block to hold the middle of the wood to be bent against the form; E, crank-screw with which to adjust block D in pressing the bending-band and wood against the form during the operation of bending; F, adjustable nut through which crank-screw E works; G G, bending-levers; H H, adjustable head-blocks working between guides on the bending-levers, these head-blocks having rollers in their inner ends to work against the bending-band when in operation; I I, crank-screws with which to adjust head-blocks H H; J J, adjustable nuts through which crank-screws I I work, so as to be moved out or in, as may be desired; and by that means give screws I I a greater range; *k*, bending-band; L L, end pieces on ends of bending-band; M M, adjustable end-pressure blocks; N N, spring-washers on screws which adjust end-pressure blocks. These spring-washers allow the end-pressure blocks to yield a little, that the wood, when being bent, may not be held too rigid. O, rope with which to operate bending-levers; P P, sheaves around which rope *o* passes; Q, windlass with which to operate bending-levers; R, rollers in head-blocks H H.

Operation: The wood to be bent is first steamed, cut to the right length, and placed crosswise of the bending-machine, between the form B and block D, the bending-band K being between the wood and block D. Block D is then pressed by turning crank-screw E against the bending-band, holding the wood firmly against the form, levers G G having been turned back, as shown in Fig. 3. The adjustable blocks H H are then run up by crank-screws I I, bringing rollers R near the bending-band. The machine being thus adjusted, windlass Q is turned by its crank, winding rope O around it, which draws the outer end of levers G G forward, pressing the wood against the form, and thus bending it to the desired shape.

By means of head-blocks H H, operated by crank-screws I I, wood can be bent over an eccentric form equally well as over a circular form, for by this arrangement wood can be pressed against any part of the form that may be desired.

What I claim as my invention, and desire to secure by Letters Patent, is—

1. Levers G G, form B, bending-band K, adjustable end-pressure blocks M M, and rubber springs N N, combined substantially as and for the purpose described.

2. Bending-band K, adjustable end-pressure blocks M M, and rubber springs N N, in combination, substantially as and for the purpose described.

H. E. STAGER.

Witnesses:
J. B. SMITH,
C. A. SMITH.